United States Patent [19]

Edmondson et al.

[11] 4,091,623
[45] May 30, 1978

[54] GEOTHERMAL ACTUATED METHOD OF PRODUCING FRESH WATER AND ELECTRIC POWER

[76] Inventors: Jerry M. Edmondson, 1526 Delta, Apt. C, San Gabriel, Calif. 91776; Mark H. Smoot, 6995 Atlantic Pl., Long Beach, Calif. 90805

[21] Appl. No.: 732,317

[22] Filed: Oct. 14, 1976

[51] Int. Cl.² ............................................. F03G 7/04
[52] U.S. Cl. ....................................... 60/641; 60/648; 203/11; 203/22; 203/88; 203/100; 203/DIG. 20
[58] Field of Search .................. 60/641, 648; 203/100, 203/10, 11, 22, 88, DIG. 20

[56] References Cited

U.S. PATENT DOCUMENTS

| | | | |
|---|---|---|---|
| 3,140,986 | 7/1964 | Hubbard | 203/100 |
| 3,490,513 | 1/1920 | Villanueva | 60/641 X |
| 4,009,082 | 2/1977 | Smith, Jr. | 203/DIG. 20 |

*Primary Examiner*—Allen M. Ostrager
*Assistant Examiner*—Stephen F. Husar
*Attorney, Agent, or Firm*—William C. Babcock

[57] ABSTRACT

Method and apparatus for implementing the same to provide fresh potable water and electric power from a source of natural brine by the use of energy derived from a geothermal source of pressurized fluid that is of a temperature of greater than 212° F, and which fluid may contain numerous minerals and extraneous material entrained and/or dissolved therein, together with apparatus for carrying out the method. In addition, the invention encompasses a method of providing a clean source of heat for energy conversion from a geothermal source together with an apparatus for carrying out the method.

22 Claims, 4 Drawing Figures

GEOTHERMAL ACTUATED METHOD OF PRODUCING FRESH WATER AND ELECTRIC POWER

BACKGROUND OF THE INVENTION

1. Field of the Invention

Geothermal Actuated Method of Producing Fresh Water and Electric Power.

2. Description of the Prior Art

The first part of the present invention is particularly adapted for use in reducing the extent of pollution that exists in certain lakes and inland bodies of water such as the Salton Sea, located in the Imperial Valley, near El Central, California. Adjacent the Salton Sea is an area of tremendous geothermal energy potential.

The salt content of water in the Salton Sea has increased in recent years to a level that is highly detrimental to marine life. By the use of the present invention, the Salton Sea may be reclaimed as a desirable environment for marine life. The method may be carried out by sequentially withdrawing water from the Salton Sea, distilling a portion of the withdrawn water by utilizing heat from the nearby geothermal sources, returning fresh potable distilled water to the Salton Sea, saline water to the geothermal reservoir, and concurrently generating electric power as the above-described operation is carried out.

A major object of the second part of the present invention is to supply a method of utilizing hot, pressurized fluid from a geothermal source to provide a clean source of heat for energy conversion, with minerals and extraneous material in the pressurized fluid being removed, and pure, uncontaminated steam being evolved as the method is carried out that may be used for power generating or heating purposes.

SUMMARY OF THE INVENTION

In the first and simplest form of the invention a bore hole is formed in the earth adjacent a natural body of saline water such as the Salton Sea, which bore hole has pressurized mineral-containing fluid discharging therefrom at a temperature of greater than 212° F. Valve means are provided to control the discharge of the pressurized mineral-containing fluid from the bore hole.

A closed reservoir is provided to which saline water from the Salton Sea can flow, preferably by gravity. The reservoir is preferably insulated to retain heat within the confines thereof, and the reservoir having pressurized fluid from the geothermal source discharging therein. Intermittently, water from the Salton Sea or other source of saline, aqueous liquid is discharged into the reservoir. Pressurized fluid from the geothermal source has a sufficient heat content that it tends to flash into steam when discharged into the reservoir under reduced pressure, with the steam being discharged below the body of saline water from the Salton Sea that is in the reservoir. The pressurized fluid heats the combined water in the reservoir and transforms the same into steam which flows therefrom to a first heat exchanger where the steam is at least partially condensed to water by the cooling effect of water flowing through the first heat exchanger from the Salton Sea to the reservoir.

The partially condensed steam and condensate flows to a second heat exchange where condensation of the steam to water is completed. The water accumulating in the second heat exchanger is by a pump or similar means withdrawn therefrom, and by the use of suitable valving, the water may be returned to the Salton Sea, or diverted for other uses such as irrigation, or the like.

In a second form of the invention a reservoir is used to entrap extraneous material produced with the pressurized fluid from a geothermal source thereby providing clean steam. The steam discharging from the closed reservoir is used to transform a low boiling point liquid to pressurized vapor that is used to drive a gas turbine that is connected to an electric generator. The pressurized vapor discharging from the turbine is cooled in a heat exchanger to return the vapor to the liquid state, and the low boiling point liquid is recycled by a pump. The pump in this form of the invention may be driven by an electric motor that is furnished with electric power from the turbine-driven generator. In the second form of the invention the steam condensate can be returned to the reservoir rather than diverted for other uses. Residual material is removed from the heating reservoir and returned by pump or similar means to the subsurface stratum containing the geothermal resource.

A third form of the invention is, in effect, a combination of the first and second forms, with the third form providing electric energy as well as potable fresh water that is returned to the Salton Sea, or used for irrigation or other desired purposes.

A fourth form of the invention is, in effect, a combination of all of the previously described forms with the addition of a means for separating the initial steam from the geothermal source, and using the heat from the initial steam to heat the vapors evolved from the low boiling point liquid.

The first part of the invention has been described with reference to the Salton Sea as the source of saline water, but it will be apparent that it is also adapted for use wherever there is a source of geothermal pressurized fluid that is heated above 212° F, and wherever there is a substantial source of saline or otherwise contaminated water. It should be noted that in any of the forms excess liquids accumulated in the enclosed reservoir can be withdrawn for reinjection in or about the geothermal source.

DESCRIPTION OF THE PREFERRED EMBODIMENTS

Figure 1:
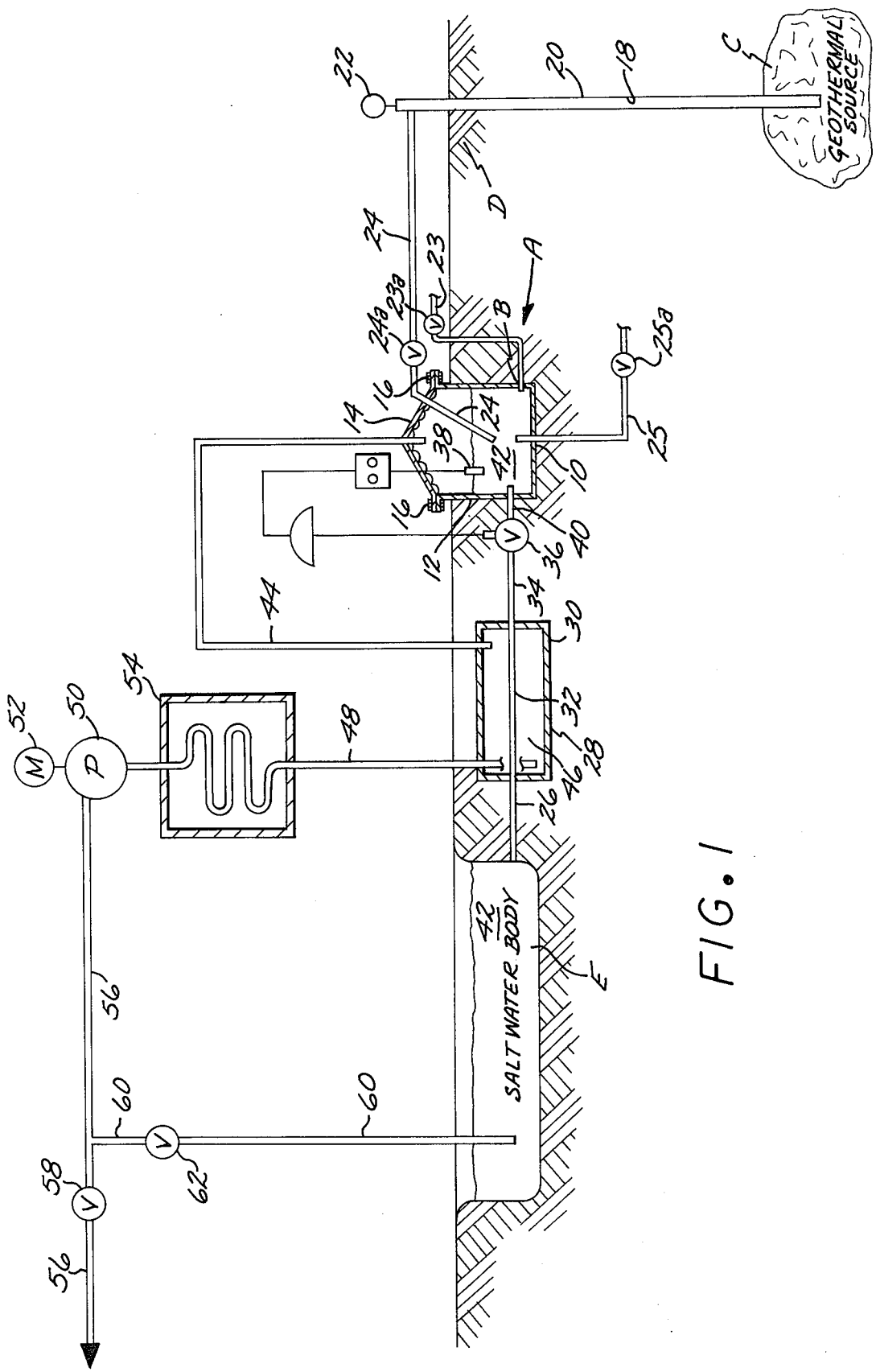
FIG. 1 is a diagrammatic view of the apparatus used in carrying out the first method.

The apparatus used in carrying out the first method that permits the salt content of water in the Salton Sea to be reduced by use of geothermal energy is illustrated in FIG. 1.

The apparatus includes an evaporation reservoir B defined by a bottom 10 and side wall 12 from a heat insulating material. Side wall 12 has a top 14 removably secured thereto by bolts 16 or other fastening means. A geothermal source C of pressurized fluid has a bore hole 18 drilled thereto through the earth D, with the bore hole having casing 20 therein that is closed at the top. The evaporation reservoir B has a conduit 25 containing a valve 25a for the purpose of withdrawing excess fluids from the evaporation reservoir B. The casing 20 has a pressure gauge 22 on the upper closed end. A first conduit 24 extends from casing 20 to the interior of reservoir B. First conduit 24 has a valve 24a therein.

A body of saline water such as the Salton Sea E has a second conduit 26 extending therefrom to a first heat exchanger 28 that includes a shell 30. The shell 30 has a heat exchange tube 32 therein that extends to a conduit 34 that leads to a valve 36 that opens and closes in response to a level sensor 38 situated in reservoir B.

Valve 36 has a conduit 40 leading therefrom to the interior of reservoir B. Salt water 42 flows from the body E thereof through conduit 26, heat exchanger 28, conduit 34, valve 36, and conduit 40, to the interior of reservoir B where it is heated by pressurized fluid discharged through conduit 24 from the source C. The pressurized fluid contains dissolved and entrained minerals and foreign material that mix with the salt water 42 in reservoir B to provide a liquid 42' therein. A substantial portion of the pressurized liquid flashes into steam in reservoir B, with this steam together with steam from liquid 42', discharging through a conduit 44 to the interior 46 of heat exchanger 28.

A suction line 48 extends downwardly into the interior 46 of heat exchanger 28 and is connected to the intake of a pump 50 that is driven by a motor 52, or other prime mover. Suction line 48 has a second heat exchanger 54 therein to condense any steam that is not transformed into condensate in first heat exchanger 28. Pump 50 discharges mineral-free condensate to a conduit 56 that extends back to the Salton Sea or other body of saline water E. Conduit 56 has a first valve 58 therein. A conduit 60 is connected to conduit 56 upstream from first valve 58. Conduit 60 has a second valve 62 therein.

In operation, reservoir B has a quantity of salt water 42 placed therein and valve 24a is opened. Pressurized fluid from source C discharges into reservoir B and heats the liquid mixture 42' to the extent that steam is evolved therefrom and flows upwardly through conduit 44 to the interior 46 of heat exchanger 28. Valve 36 is open and salt water 42 flowing through conduit 32 cools the steam and causes it to transform into condensate. Valve 36 closes when the temperature of the liquid 42' drops to the extent steam is not vigorously discharged therefrom.

The condensate is withdrawn from heat exchanger 28 through conduit 48 by operation of pump 50. The condensate is discharged from pump 50 through conduit 56. By closing valve 58 and opening valve 62 the condensate is returned to the Salton Sea E to dilute the water 42 therein and reduce the percentage of salt therein. When valve 62 is closed and valve 58 is opened, the mineral-free condensate is discharged to a desired location for such uses as irrigation and the like. When excess fluids collect in the evaporation reservoir B, valve 25a is opened and the excess fluids are withdrawn, flowing through conduit 25.

Figure 2:
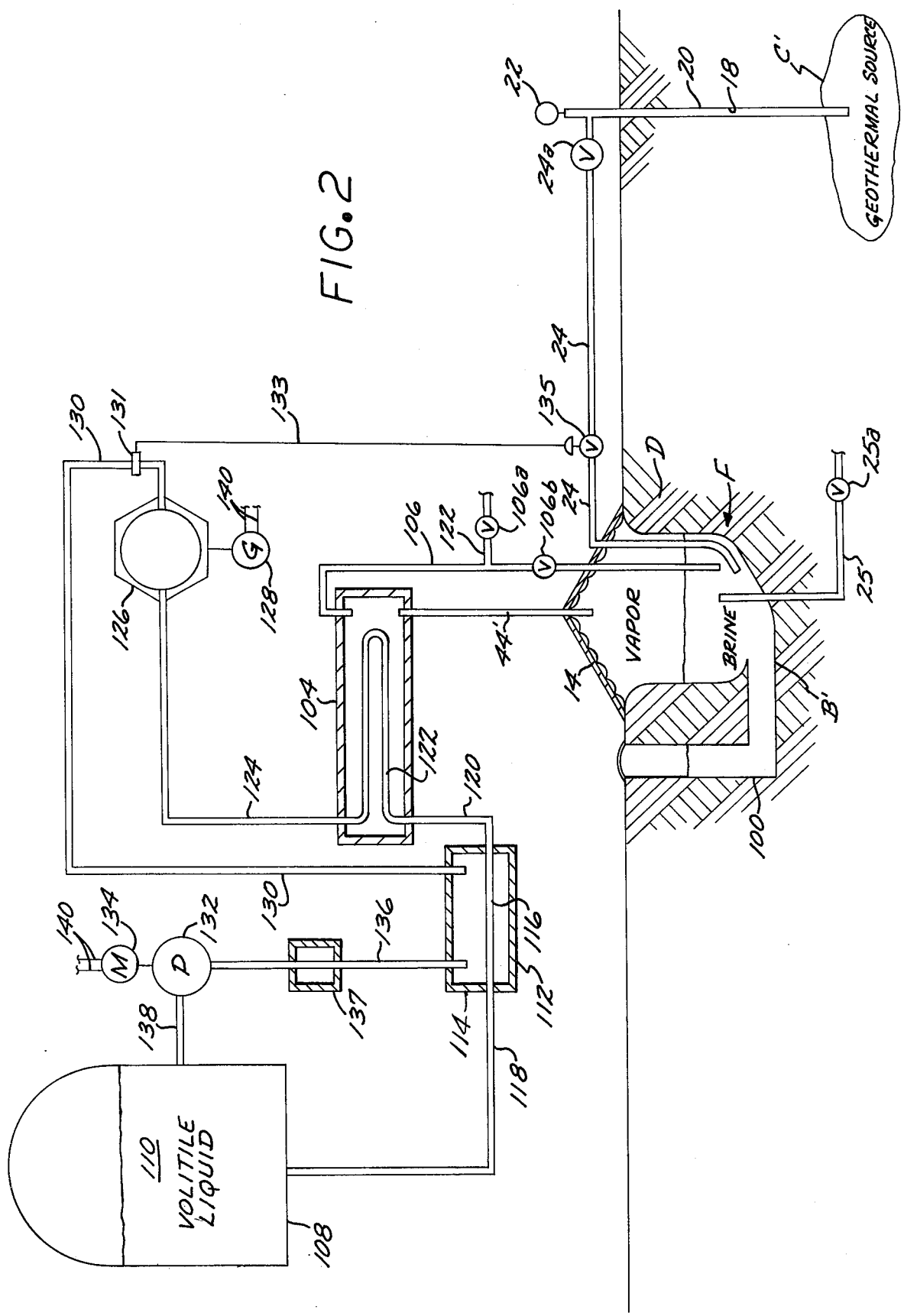
FIG. 2 is a diagrammatic view of the apparatus used in carrying out the second method.

The apparatus F used in carrying out the second method of the invention is shown in FIG. 2. Elements of the apparatus F common to the first form A are identified by the same numerals and letters previously used, but have primes added thereto in the drawings.

In the apparatus F, the reservoir B is replaced by a reservoir B' that has a concentrated residue sump 100 in communication therewith. The conduit 44' extends to the interior of a first heat exchanger 104. Heat exchanger 104 is connected to a conduit 106 that returns steam condensate to reservoir B' or the condensate can be diverted to other use by opening valve 106b for discharge of the condensate through conduit 122, and closing valve 106b.

A container 108 is provided for a low boiling point liquid 110. A second heat exchanger 112 is provided that has a hollow shell 114 in which a first heat exchange tube 116 is disposed. Liquid propane 110 flows from container 108 to heat exchange tube 116. Tube 116 is connected by a conduit 120 that has a portion 122 thereof in the first heat exchanger 104. The heat exchanger 104 is connected by a conduit 124 to the inlet of a gas turbine 126 that drives an electric generator 128. First heat exchanger 104 transforms the low boiling point liquid to pressurized vapor that drives the turbine 126. Pressurized vapor discharges from turbine 126 through a conduit 130 to return to the interior of second heat exchanger 112 where it transforms to the liquid state due to cooling by tube 116.

A temperature sensor 131 is included in line 130 which by conventional means 133 opens and closes a temperature responsive valve 135 in line 24. A pump 132 is driven by a motor 134. Pump 132 has the suction thereof connected to a conduit 136 that extends to the interior of second heat exchanger 112. Pump 132 has the discharge thereof connected to a conduit 138 that is in communication with the interior of container 108. The generator supplies electric power to two electrical conductors 140, and the motor 132 may be supplied by electric power from these conductors 140.

In the method carried out by the second apparatus F, the heat from steam in the first heat exchanger 104 transforms the low boiling point liquid in the tube 122 to pressurized vapor to drive turbine 126. Vapor in conduit 124 discharged from turbine 126 enters conduit 130 to be thereafter liquified in second heat exchanger 112. The pump 132 withdraws the low boiling point liquid from second heat exchanger 112 through conduit 136 and returns the liquid to container 110 through conduit 138. Thus, the heat from the geothermal source C' is used to generate electric power, with only the reservoir B' being subjected to the corrosive pressurized fluid from the geothermal source C'.

Figure 3:
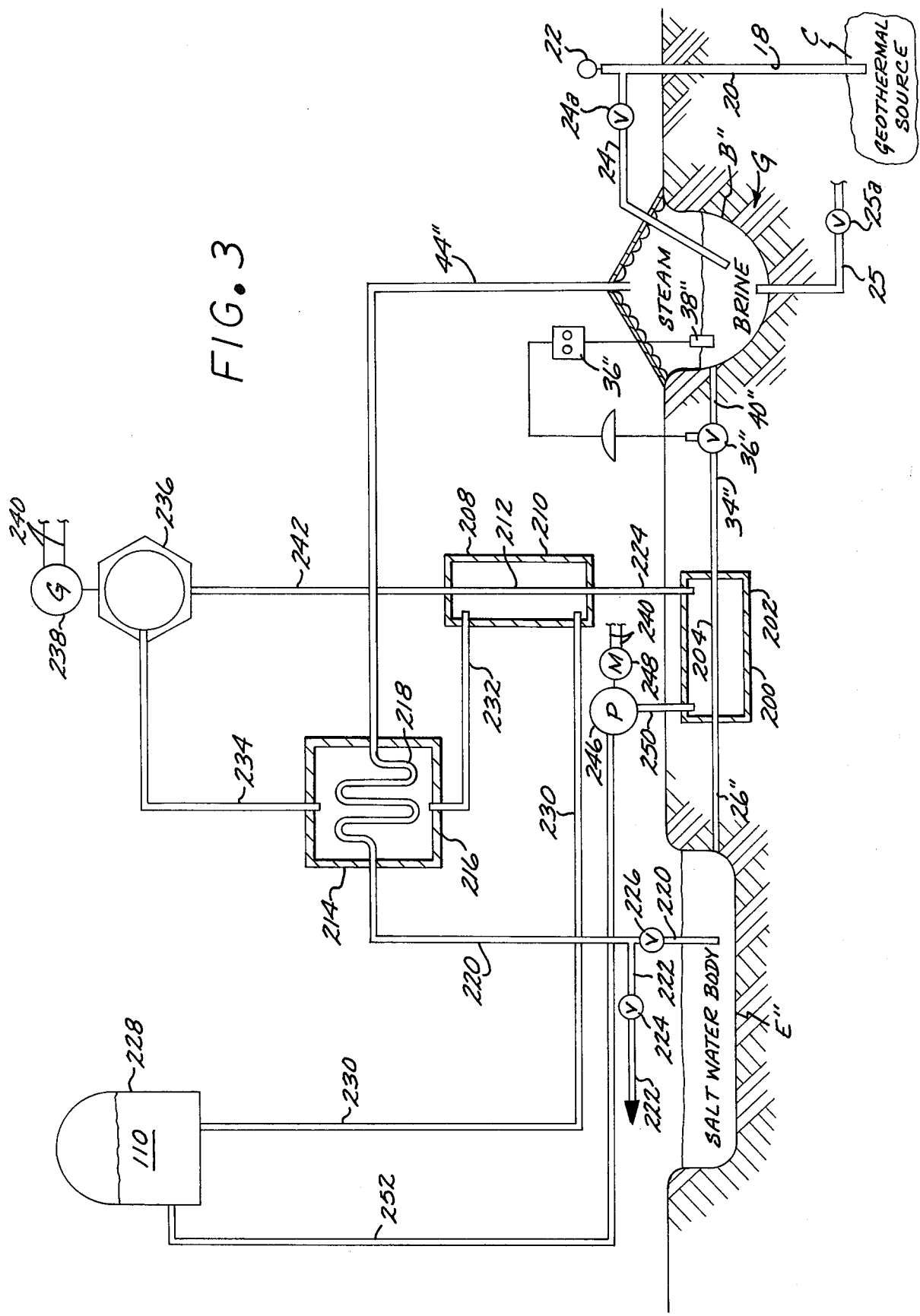
FIG. 3 is a diagrammatic view of the apparatus used in carring out the third method.

The apparatus G used in carrying out the third method of utilizing heat from a geothermal source to reduce the salt content of the Salton Sea E is shown in FIG. 3. Elements in the third form G common to the apparatus of the first form A are identified by the same numerals and letters previously used, but to which double primes are added in the drawings.

Apparatus G as shown in FIG. 3 includes a first heat exchanger 200 having a shell 202 and internal heat exchange tube 204, with tube 204 being connected to conduits 26" and 34". A second heat exchanger 208 is provided that includes a shell 210 and heat exchange tube 212. Apparatus G includes a low boiling point liquid vaporizer 214 having a shell 216 and heat exchange tube 218. Conduit 44" is connected to heat exchange tube 218, with the other end of tube 218 connected to a conduit 220. Conduit 220 has a tee therein from which a conduit 222 extends. Conduit 222 has a valve 224 therein. Conduit 220 downstream from the tee has a valve 226 therein. Steam discharging from reservoir B" through conduit 44" is condensed in vaporizer 214, with the steam condensate returning to the Salton Sea E" when valve 226 is openaand valve 224 closed. By closing valve 226 and opening valve 224, the steam condensate may be directed to a desired destination through conduit 222 to be used for irrigation, or the like.

Apparatus G includes a low boiling point liquid container 228 that has a conduit 230 extending therefrom to the interior of heat exchanger 208 where low boiling point liquid 110 flows therethrough to discharge through a conduit 232 to vaporizer 214. Pressurized vapor of the low boiling point liquid 110 discharges from vaporizer 214 through a conduit 234 to the inlet to a gas turbine 236. Gas turbine 236 drives an electric generator 238 that supplies electric power to two conductors 240. Pressurized vapor discharged from turbine 236 flows through a conduit 242 connected to tube 212 of heat exchanger 208. The pressurized vapor when flowing through tube 212 is cooled due to the tube being in contact with low boiling point liquid 110 flowing through heat exchanger 208. Tube 212 is connected to a conduit 224 that extends to the interior of heat exchanger 200.

Vapor of the low boiling point liquid 110 entering heat exchanger 200 is cooled and returned to the liquid state by water flowing through heat exchange tube 204. A pump 246 is provided that is driven by a motor 248 that is supplied with electric power through conductors 240. The pump 246 withdraws liquid 110 from heat exchanger 200 through a conduit 250 and discharges the liquid back to container 228 through a conduit 252.

In the method carried out by the apparatus G, steam from reservoir B" flows through conduit 44" to low boiling point liquid vaporizer 214 where it is condensed, with the condensate discharging to the conduit 220 for a desired use as previously explained. Low boiling point liquid 110 flows from container 228 through conduit 230 to heat exchanger 208 and conduit 232 to vaporizer 214. Pressurized vapor flows from vaporizer 214 through conduit 234 to turbine 236 to drive the latter, and the turbine in turn driving an electric generator 238. Vapor discharged from turbine 236 flows through conduit 242, heat exchanger 208, and conduit 224 to heat exchanger 200 where it is liquified to the low boiling point liquid 110. Liquid 110 in heat exchanger 200 is withdrawn therefrom through conduit 250 by pump 246, and the pump returning the liquid 110 to the container 228 through conduit 252.

From the above description of apparatus G it will be seen that the steam discharged from reservoir B" is recovered as mineral-free condensate to be returned to the Salton Sea or used for other desired purposes. The heat content of the steam is utilized to vaporize liquid 110 to drive the turbine 236, with the turbine in turn driving an electric generator 238 to produce electric power. It will be particularly noted that in three methods previously described the hot, pressurized fluid from the geothermal source, which fluid is normally corrosive, is kept out of contact with all of the apparatus except the reservoirs B, B' and B" into which it is discharged. When the mineral contact of fluid in the reservoirs B, B' or B" becomes excessive, the tops thereof are removed, and the sludge of minerals removed.

Figure 4:
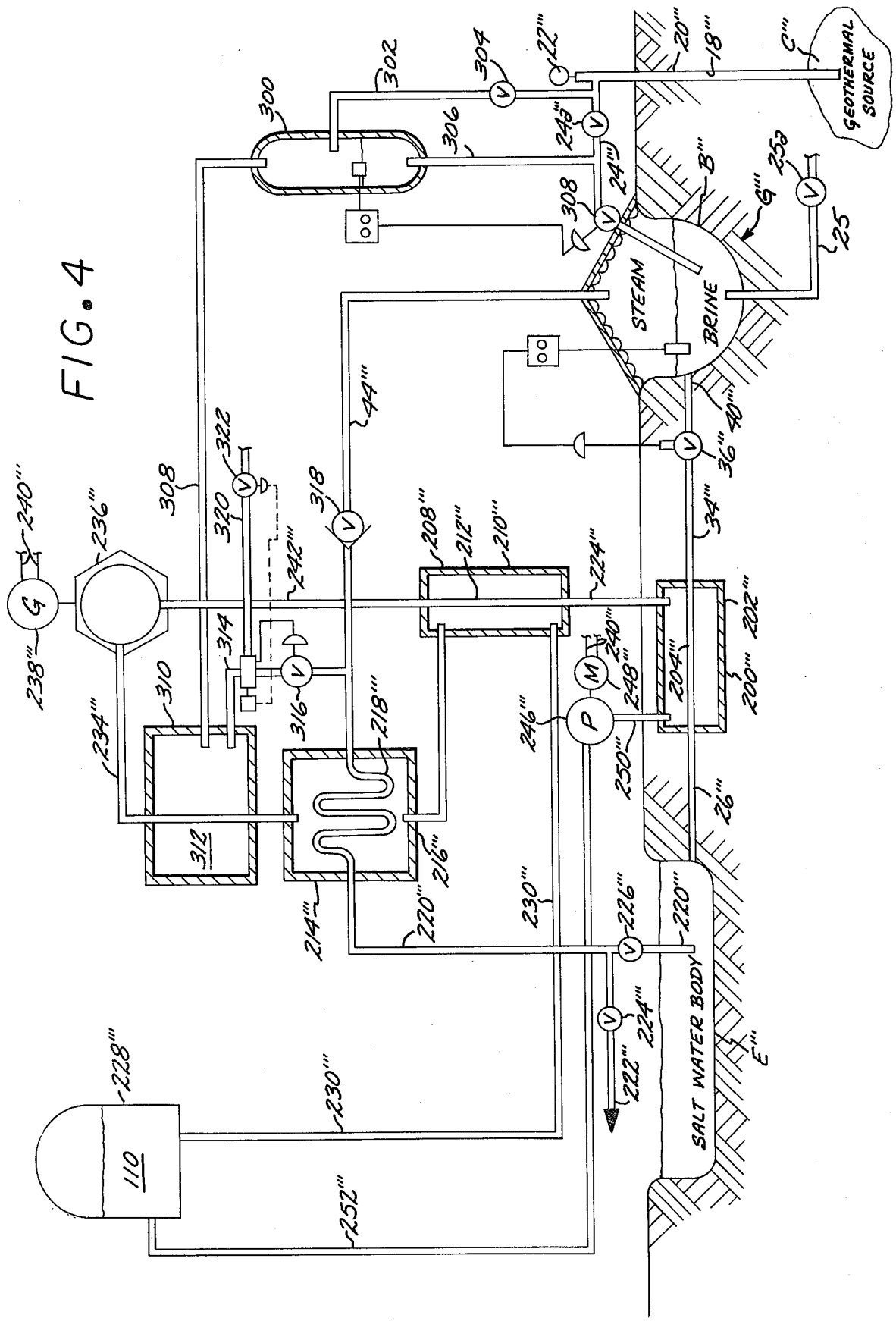
FIG. 4 is a diagrammatic view of the apparatus used in carrying out the fourth method.

The apparatus shown in FIG. 4 used in carrying out the fourth method includes all of the elements illustrated in FIG. 3, but with additional elements added thereto. Elements in FIG. 4 common to those illustrated in FIG. 3 are identified by the same numerals and letters previously used but with triple primes being added thereto.

The apparatus shown in FIG. 4 includes a steam separator 300 that is connected to conduit 24''' by a conduit 302 that includes a valve 304. A steam condensate return line 306 extends from the bottom of separator 300 to conduit 24''' downstream from valve 24a'''. A liquid level control valve assembly 308 allows condensate to flow through line 306 and conduit 24''' to evaporator reservoir B''' when the condensate rises to a predetermined level in separator 300.

Steam separator 300 has a conduit 308 extending therefrom to the interior of a super heater 310, which super heater has a section of the conduit 234''' within the interior thereof. Steam condensate 312 in super heater 310 can flow therefrom through a conduit 314. Flow of condensate 312 through conduit 314 is regulated by a pressure control valve 316. Conduit 314 is in communication with conduit 44'''. A check valve 318 in conduit 44''' prevents flow of condensate back to evaporator reservoir B'''. Non-condensed vapor can flow from super heater 310 through a conduit 320 for any desired use. A liquid level control valve 322 controls flow of non-condensed vapor through conduit 320.

The use and operation of the apparatus shown in FIG. 4 as that illustrated in FIG. 3 with the exception that the fourth method operates more efficiently in that the vaporized low boiling point liquid has a greater heat content when it flows into turbine 236'''. Also, non-condensed vapor is available from the conduit 320 for any desired use.

The various methods and apparatus used in carrying out the same have been described previously in detail and need not be repeated.

We claim:
1. A method of using hot pressurized fluid from a geothermal source to transform saline water from a natural body thereof into potable, substantially mineral free water, said pressurized fluid being at a temperature of at least 212° F., said method comprising the steps of:
   a. discharging a stream of said hot pressurized fluid into a first confined space;
   b. discharging a stream of said saline water into said first confined space to mix with said pressurized fluid therein to provide a heated mixture of said saline water and pressurized fluid from which steam is emitted;
   c. withdrawing said steam from said first confined space;
   d. cooling said steam to transform said steam into said substantantially mineral free, potable water; and
   e. directing said substantially mineral free potable water to a desired location.

2. A method as defined in claim 1 which includes cooling said steam by heat exchange with said saline water flowing to said first confined space to at least transform a part of said steam to said substantially mineral free potable water.

3. A method as defined in claim 1 in which said steam is partially condensed to said substantially mineral free potable water by heat exchange with said saline water flowing to said first confined space and the balance of said steam being condensed to said substantially mineral free potable water by heat exchange with a second cooling medium.

4. A method as defined in claim 1 in which said first stream is discharged into said first confined space at a substantially constant rate and said second stream discharged into said first confined space in such volume that said mixture boils and said steam is continuously emitted therefrom.

5. A method as defined in claim 4 in which said second stream is intermittently discharged into said first confined space in such quantities that said mixture boils and said steam is emitted continuously therefrom.

6. A method as defined in claim 1 in which said steam in said first confined space is at substantial pressure, and said steam after discharging from said first confined space being used to generate power prior to being condensed.

7. A method as defined in claim 1 in which said first confined space is insulated from the loss of heat as said method is carried out.

8. A method as defined in claim 1 in which said first confined space is provided by a structure that has access means therein to permit the removal of solid materials from said first confined space, said solid materials initially being carried into said first confined space by said first and second streams.

9. A method as defined in claim 1 in which said second stream is preheated by said steam prior to said second stream flowing into said first confined space.

10. A method as defined in claim 1 which includes the following additional steps:
   f. providing a second confined space in which a quantity of a low boiling point liquid is contained;
   g. withdrawing a stream of said low boiling point liquid from said second confined space;
   h. heating said stream of low boiling point liquid with said steam to transform said low boiling point liquid to a stream of vapor that is under substantial pressure;
   i. directing said stream of vapor onto at least one rotatable member to cause the latter to be driven;
   j. generating electric power by said driven rotatable member;
   k. cooling said stream of vapor after it has contacted said rotatable member to condense said vapor to said low boiling point liquid; and
   l. pumping said low boiling point liquid that has condensed back into said second confined space.

11. A method as defined in claim 10 in which said steam is condensed to said mineral free, potable water by heat exchange with said stream of low boiling point liquid prior to the latter being transformed to said stream of vapor under pressure.

12. A method as defined in claim 10 in which said pumping is effected by electric power, and said electric power being that generated by an electric generator driven by said rotatable member.

13. A method as defined in claim 10 in which said rotatable member is a bladed rotor of a turbine.

14. A method as defined in claim 13 in which said electric power is generated by said rotor driving an electric generator.

15. A method as defined in claim 1 in which said desired location is said natural body of water, and said natural body of water having the percentage by weight of salt therein reduced due to said substantially mineral-free potable water being added thereto.

16. A method of using a source of hot, pressurized fluid from a geothermal source thereof adjacent a natural body of saline water to concurrently generate electric energy and to sequentially transform a stream of said saline water to substantially mineral free potable water, said method comprising the steps of:
   a. discharging a stream of said hot pressurized fluid to a first confined space;
   b. discharging a stream of said saline water to said first confined space from said natural body thereof to provide a boiling mixture of said hot pressurized fluid and said saline water from which steam is emitted;
   c. removing a stream of steam from said first confined space;
   d. providing a second confined space in which a quantity of a low boiling point liquid is disposed;
   e. removing a stream of said low boiling point liquid from said second confined space;
   f. transforming said stream of low boiling point liquid to a stream of pressurized vapor by heat exchange with said stream of steam, with said stream of steam being condensed to said substantially mineral-free water as a result of said heat exchange;
   g. directing said stream of pressurized vapor into contact with a rotatable member to rotate the latter;
   h. generating electric power by rotation of said rotatable member;
   i. condensing said stream of pressurized vapor back to said low boiling point liquid by heat exchange between it and said stream of low boiling point liquid prior to the latter being vaporized;
   j. pumping said low boiling point liquid after it has condensed back to said second confined space;
   k. directing said substantially mineral-free water after it has condensed to a desired location; and
   l. removing excess fluids collected in first confined space for disposal.

17. A method as defined in claim 16 in which said pumping is carried out by electric energy, and said electric energy being supplied by rotation of said rotatable member.

18. A method as defined in claim 16 in which said desired location is said natural body of saline water, with said natural body of saline water having the percentage by weight of salt therein lowered as said substantially mineral-free water is added thereto.

19. A method as defined in claim 1 in which first confined space is provided with a means for removal of excess fluids that accumulate in said confined space.

20. A method as defined in claim 16 which includes the further steps of:
   l. separating pressurized super heated steam from said pressurized fluid prior to the latter discharging to said first confined space;
   m. heating said stream of vapor with said pressurized super heated steam prior to said stream of vapor being directed onto said bladed rotatable member; and
   n. directing condensate that arises in the separation of said pressurized super heated steam to said first confined space.

21. A method as defined in claim 20 which includes the further steps of:
   o. directing condensate of said pressurized super heated steam that arises when said stream of vapor is heated to said desired location.

22. A method as defined in claim 21 which includes the further steps of:
   p. directing uncondensed super heated steam after it has heated said vapor to another desired location.

* * * * *